(12) United States Patent
Koch et al.

(10) Patent No.: US 6,359,985 B1
(45) Date of Patent: Mar. 19, 2002

(54) PROCEDURE FOR MARKING BINARY CODED DATA SETS

(75) Inventors: Eckhard Koch, Bensheim (DE); Jian Zhao, Providence, RI (US)

(73) Assignee: Fraunhofer Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 08/981,300

(22) PCT Filed: Jun. 14, 1996

(86) PCT No.: PCT/DE96/01057

§ 371 Date: Apr. 27, 1998

§ 102(e) Date: Apr. 27, 1998

(87) PCT Pub. No.: WO97/00578

PCT Pub. Date: Jan. 3, 1997

(30) Foreign Application Priority Data

Jun. 16, 1995 (DE) ........................................ 195 21 969

(51) Int. Cl.[7] ................................................ G06F 1/24
(52) U.S. Cl. ........................................ 380/54; 382/232
(58) Field of Search ................................ 382/100, 232; 380/54

(56) References Cited

U.S. PATENT DOCUMENTS 4,776,013 A 10/1988 Kafri et al.

FOREIGN PATENT DOCUMENTS

| EP | 0 454 556 | 10/1991 |
| EP | 0 581 317 | 2/1994 |
| EP | 0 610 587 | 8/1994 |
| EP | 0 614 308 | 9/1994 |
| EP | 0 619 677 | 10/1994 |
| EP | 0 633 703 | 1/1995 |
| EP | 0 641 130 | 3/1995 |
| EP | 0 648 055 | 4/1995 |
| WO | 94 07 326 | 3/1994 |

OTHER PUBLICATIONS

Upham, JPEG Software (release 4) Documentation, Jun. 7, 1993, pp. 1–2.
Shaggy, Hide and Seek v 4.0 Documentation, Apr. 10, 1994, pp. 1–3.
Bruyndonckx et al, Spatial Methods for Copyright Labeling of Digital Images, 1994, pp. 1–6.
Tanaka et al, Embedding Secret Information into a Dithered Multi–level Image, 1990, IEEE, pp. 0216–0220.
Matsui and K. Tanaka, "Video–Steganography: How to Secretly embed a Signature in a Picture", IMA Intellectual Property Proceedings vol. 1, No. 1, 1994.
J. Brassil et al., "Electronic Marking and Identification Techniques to Discourage Document Copying", AT&T Bell Laboratories, Murray Hill, N.J., 1994.

*Primary Examiner*—Thomas R. Peeso
(74) *Attorney, Agent, or Firm*—Crowell & Moring LLP

(57) ABSTRACT

Disclosed is a method of marking binary-coded data sets, especially image data or audio signals, by applying at least one information unit to a data set. The invention is characterized by the generation of a discrete position sequence for the application of information units to the data set to be marked, taking into account data-specific characteristics and using a key; and by the fact that the information unit to be applied is written and read at the positions established in the position sequence in the data set.

20 Claims, 4 Drawing Sheets

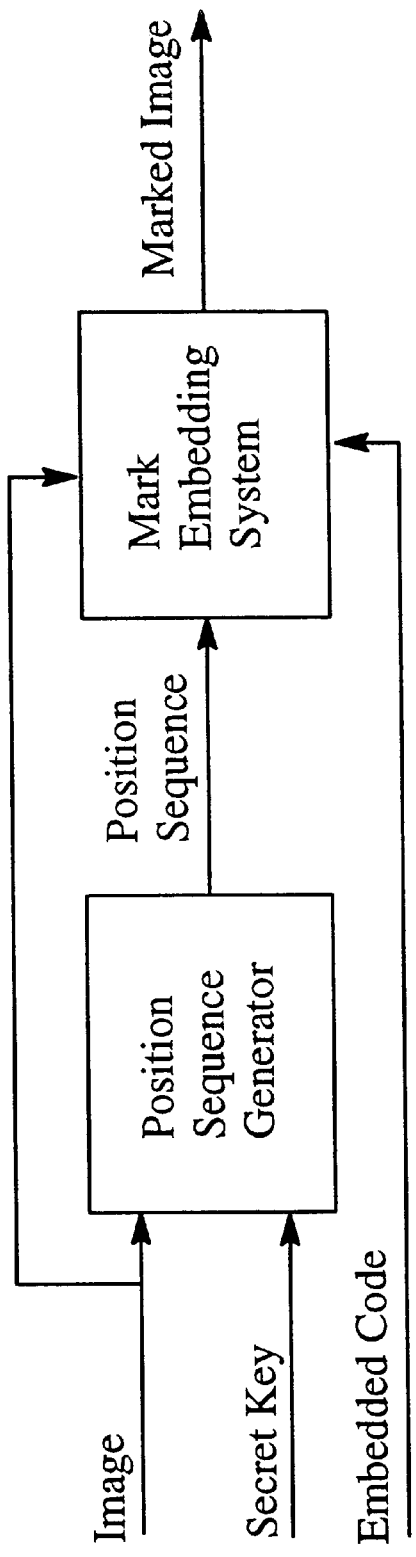
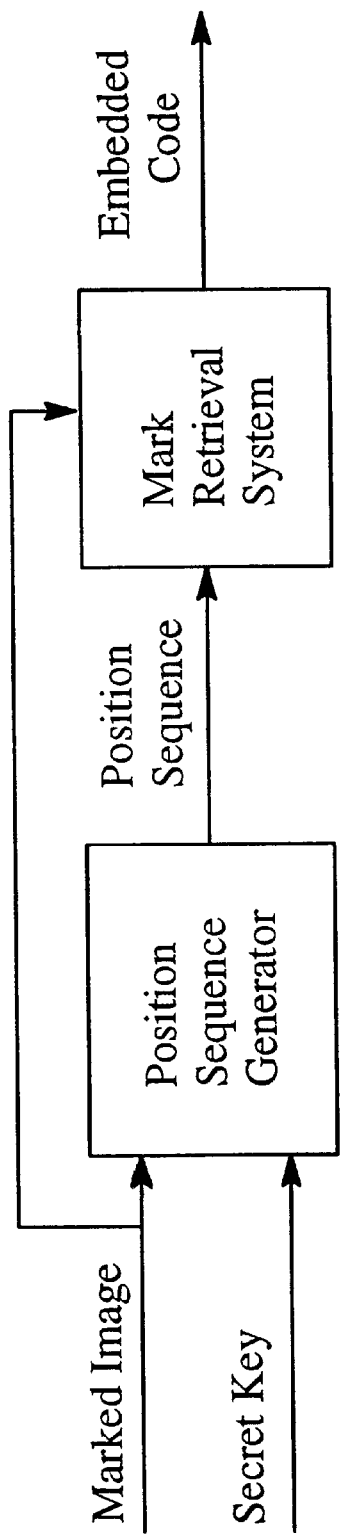

|  e₁ | e₂ | e₃ |
|---|---|---|
| Hoch | Mitte | Tief |
| Mitte | Hoch | Tief |
| Hoch | Hoch | Tief |
| Mitte | Tief | Hoch |
| Tief | Mitte | Hoch |
| Tief | Tief | Hoch |
| Hoch | Tief | Mitte |
| Tief | Hoch | Mitte |
| Mitte | Mitte | Mitte |

Rows 1–3: Muster für "1"
Rows 4–6: Muster für "0"
Rows 7–9: "ungültige" Muster

PROCEDURE FOR MARKING BINARY CODED DATA SETS

TECHNICAL FIELD

The invention is in the field of marking binary coded data sets, particularly concerning image data and audio signals by embedding at least one information unit in a data set.

BACKGROUND ART

Protection of intellectual property rights and usage rights is one of the main concerns of producers of information, publishers, media companies and usage rights brokers. One of the paramount concerns of the creators of intellectual property is protection from illicit copying and distribution of copyrighted multimedia data. In many cases, as for instance in the case of the distribution of digitally stored data the direct inhibition of illicit distribution is not possible. To counter this, techniques have been developed which allow the detection and tracking of illicit copying and distribution as well as tracing the original perpetrator.

Such measures for embedding information in the particular electronic data sets constitute so-called steganographic measures which allow the integration of additional secret information in data by modifying the original data without significantly degrading the quality or appearance of the original data.

A number of different methods for slightly modifying original digital data in order to embed additional information have been investigated. Matsui & Tanaka have proposed a number of steganographic methods for identifying intellectual property in digital images, videos and facsimiles. Refer to the publication of Matsui and K. Tanaka "Video-Steganography: How to secretly embed a signature in a picture", IMA Intellectual Property Proceedings Vol. 1, No. 1, 1994 for details.

The underlying principle of their methods is based on embedding the information in such a way as to make it appear that it is merely a further imprecision (i.e. an increase in the noise level) in the original data.

Researchers at AT&T have investigated possibilities for embedding information in another class of documents, namely structured text, by means of inserting distortions in the form of varying in a controlled fashion the spacing between subsequent lines as well as the inter-word spacing. Refer to the publication by J. Brassil et al. "Electronic Marking and Identification Techniques to Discourage Document Copying", AT&T Bell Laboratories, Murray Hill, N.J., 1994 for details.

The existing steganographic techniques for digital imagery do not by any measure meet the requirements for the protection and proof of intellectual property rights to multimedia productions and information. This is due to the fact that the techniques do not offer any protection against both intentional and inadvertent attacks which are possible by digital processing especially of image data. The deletion, modification or gross distortion of the embedded information may easily be accomplished by a lossy image compression, low pass filtering and/or change of the data/image representation in the case of the older techniques. However, such processing steps are often performed by necessity on the way of a digital multimedia document from the creator to the final consumer or user; hence the mentioned techniques are unsuited for yielding a proof of authenticity or for identification of the intellectual rights holder.

The European publication EP 0 581 317 contains a method for digital marking of digital data sets, e.g. digital image data. The method described in this publication allows the integration of digital signatures, a.k.a. markings in digital image data. The digital signatures are embedded to allow the future identification of the images. This is accomplished by identifying pixels of the image which contain relative minima and maxima (i.e. extreme values) in the pixel values. From the thusly identified pixels, pixels are determined for the integration of an identification code, the so-called signature. In order to integrate each bit of the signature at a selected point of the image, the pixel values of the selected pixel as well as the pixel values of the surrounding pixels are adapted, i.e. modified. This technique has the Immanent drawback that the selected positions for the integration of the signature values are easily determined and may therefore be assumed as known to attackers. By selecting the positions of the originally present extreme values the thus integrated identification codes may easily be detected and removed accordingly.

Similarly, the European Publication EP 0 614 308 A1 contains a method for encrypting data. Such encryption techniques accomplish the complete scrambling of the entire data set for unauthorized access. In this technique, high resolution image components are protected from illicit access by means of a key or an encryption technique. Non-high-resolution image components may however remain freely accessible so that a hierarchical access control for the information is realized. The entirety of the image information may be present in one storage medium while only authorized users may access all of the image data present. The above mentioned European publication does not serve to accomplish a directed marking of e.g. image information for a future identification; it merely serves to encrypt the entire information content of an image so that unauthorized users do not gain access to the information.

DISCLOSURE OF THE INVENTION

The invention comprises a procedure for marking binary coded data sets, particularly but not limited to image data and audio signals by embedding at least one information unit in a data set in such a way as to embed information serving to uniquely identify the data set to be protected so that the relationship between the data set and the embedded information is not lost in a number of modifications of the data set. The identification procedure shall offer the creator as well as the customers and distributors of multimedia creations the opportunity to confirm and prove the possession of intellectual property rights to the data as well as supply proofs of abuse of the multimedia data.

The invention of the procedure for marking binary data, particularly but not limited to image data or audio signals, comprises the generation of a discrete position sequence for the integration of information units in the data set to be marked which is dependent on features specific to the data to be marked as well as on a key, and the subsequent reading or writing of the integrated (resp. to be integrated) information units in the predetermined position sequence in the data set.

The invention also comprises the embedding of additional secret, hidden data in a robust fashion in multimedia data, i.e. particularly digital images. The same procedure can also be used for marking audio signals which are structured in time and not in pixel values.

The invention, apart from the use in color, greyscale and bilevel still images, also comprises the use with digital video data, i.e. image sequences. The embedding of the additional information does not lead to a visible degradation of the image quality. The embedded information can be reconstructed given the knowledge of a possibly secret key.

The first step in the procedure described is the generation of a pseudo-random position sequence which is used to determine the positions in which a code or more generally an information unit is embedded. Characteristic information, which may for instance be extracted from the image data itself are used in combination with a secret key as a seed value for the position generation. In a second step the information unit is either read or written in the positions determined by the positions sequence. There exist different methods for reading and writing of the information units depending on the type of image data representation.

Generally speaking there are three distinguishable marking techniques which depend on the data sets to be marked.

A. Frequency Based Marking for Color and Greyscale Images

This technique is based on the idea that typical digital images of humans, buildings, natural scenery etc. may be considered as non-stationary statistical processes which are highly redundant and tolerant to disturbances. Embedding of the binary coded information occurs in the frequency domain of the image. The subsequent description assumes a representation of the image in the spatial domain into which every image can be converted. The image is partitioned into blocks of pixels. These blocks are transformed from the spatial domain into the frequency domain by means of a transformation function. Arbitrary functions may be selected as the transformation function. One of the preferred functions is the so-called "discrete cosine transform" (DCT). Further transformations are similarly suited such as e.g. the wavelet transformation, the Fourier transformation, the Hadamard-Walsh transformations or the Z transformation. Especially when using the wavelet transformation, larger block sizes are useful. Subsequently the blocks of frequency components (i.e. the relevant parts of the blocks) are quantized. For the quantization step, quantization matrices similar to those used in the JPEG compression standard are preferred. With regard to the aforementioned compression standard, details may be found in the publication by Wallace "The JPEG still picture compression standard", Communications of the ACM, Vol. 34, No. 4, April 1991, PP 30–40. Using the position sequences found in the first step of the procedure of the invention the blocks as well as the exact positions within the selected blocks are determined in which the information will be embedded. The embedding of a single bit ("1" or "0") in a block is accomplished by establishing patterns of relations (i.e. size relations) between particular elements, the so-called frequency coefficients of the block, with a moderate variance threshold. Particularly suitable for the purpose of embedding information are medium frequencies since higher frequency components may easily be removed without visibly degrading image quality (e.g. using a lossy compression algorithm). Modifications in the low frequency components would lead to the generation of visible artifacts, degrading overall image quality. Generally speaking, however, all frequencies are usable. In order to make the information units used for embedding information as inaccessible to illicit access or data processing steps which format the data set or suitably reorder the data set as possible, the robustness of the embedded information against unauthorized access can be optimized by tuning two parameters. On one hand this is the so-called Distance D between selected quantized frequency components with a larger distance yielding a better robustness, albeit coupled with a slightly higher visibility of the modification. The second parameter is the so-called Quantization factor Q which is used for quantization of the selected values for embedding the information code. A larger quantization factor results in a smaller modification of the image data, however it also results in a lower robustness against lossy compression algorithms such as the one employed by the JPEG standard. In order to further increase the robustness against attacks, a repeated (redundant) marking process may be performed. In this case the same information or information units are embedded more than once in the original data. If all blocks of a data set have been selected and marked, a kind of "holographic" marking is achieved. In partitioning the data set into blocks, the size of the blocks may be kept variable. In an extreme case the entire data set consists of a single large block; in the case of the frequency based procedure this requires transformation of the entire block or data set. The block size may also be as low as one pixel per block with reasonable blocks sizes starting at 2×2 pixels. The different blocks in a data set may also have different sizes. After integration of the information units the image may be requantized and retransformed into a representation in the spatial domain. The procedure allows a number of variations such as e.g. the arbitrary selection of the transformation, the forming of blocks, the selection of the frequency components, the selection and assignment of encodings to the relation patterns as well as the distribution of the relation patterns and the associated coding over different blocks.

B. Relation-based Marking of Bilevel Images

The value of each single pixel in a bilevel image corresponds to either a "1" or "0" value. This leaves no room for the insertion of noise or disturbances which might be used for inserting additional information. In order to embed information which is binary encoded, suitable areas in the image must be found which will not deteriorate quality of the original image significantly. These image areas are different for each individual image or at least different for certain types of images. The proposed procedure for bilevel images is based on the relation between "0" and "1" bits in a selected block. Let R(b) be the rate of black pixels, for instance the "1" bits, in a selected block b of the image:

$$R(b)=N_S/N$$

$N_s$ means the number of black pixels in the block b and N refers to the block size, i.e. the total number of pixels in the block b. The embedding of a bit in a block b occurs following the given procedure:

A "1" bit is embedded in a block b if R(b) is within a given range (T1,min; T1,max). A "0" bit is embedded if R(b) is in a different given area (T2,min; T2,max). Both determined areas are between 0% and 100%. For embedding a bit, the respective observed block, if required, is modified by changing "1"-bits to "0"-bits or vice versa sufficiently often for R(b) to fall into the corresponding range. If too many modifications would be necessary, the block is declared invalid and modified in such a way that R(b) falls into an invalid range outside both the ranges of "0" and "1". Furthermore, a buffer is introduced between the given ranges and the invalid range which increases the degree of robustness against the use of image manipulation techniques on the marked image. The buffer therefore describes the number of bits in a block which may be changed by image manipulation techniques without damaging the embedded bits. For example, a buffer of 5% means that changing less than 4 bits within an 8×8 bit block does not damage the embedded code. A reasonable choice of the areas (T1,min; T1,max) and (T2,min; T2,max) as well as the buffer (e.g. T1=(55,60), T2=(40,45) and a buffer of 5 for an 8×8 bit block) allows a reasonable balance between robustness against image manipulation techniques on one hand and the visibility of the embedded information on the other hand. The algorithm used for adding the information units in the positions predetermined by the position sequence of the data sets is to some degree dependent on the distribution of the "1" and "0" bits. For example, in the case of "dithered" images, the modifications are evenly spread across the entire block. The bit which has the most neighbors of the same value is changed. In the case of bilevel images (black/white) with sharp contrasts the modifications are performed at the edges between black and white areas. The bit with the most neighbors of the opposite value is changed. In both cases the bits of the neighboring blocks are drawn into consideration. As described above a criterion for the selection of suitable blocks is introduced which is characterized as a threshold T. If the changes to the selected coefficients of a block are <T then the block is valid, otherwise it is invalid. In the following section several methods are proposed which allow the decision whether or not the block under consideration is valid or not during the extraction process:

- A statement regarding the validity of each block for the reconstruction of the marking is stored as the second part of the key. A sequence "110111 . . . " informs that the first, second, fourth, fifth and sixth block is valid whereas the third block is invalid. The sequence of blocks is—as before—determined via the key (i.e. the first part of the key) and the characteristic properties of the image.
- A second method defines a buffer between the valid and invalid blocks. If a modification of the coefficients for the integration of the marking is larger than the threshold T but smaller than the sum of threshold and buffer, then the buffer is modified in such a way that the modification is larger than the sum of the threshold and the buffer. This technique is applied in both aforementioned cases.
- If the threshold T is set to zero then no modifications of the original data for the embedding of the marking are allowed. In this case a natural embedding process is used, i.e. only such blocks which do not require a change in the relationships between the frequency coefficients are used for marking. The information which blocks/positions are used for marking are embedded as the second part of the key.

C. Procedures for Marking of Image Sequences

The aforementioned procedures for marking of images mainly refer to marking techniques for still images; however, they may also be applied to image sequences such as videos. In the case of image sequences, additional modes of attack against markings are possible. For example, markings of single frames may be removed by deleting the frame from the sequence. Motion estimating and motion compensating compression techniques such as those applied in the MPEG standard may also lead to the removal of markings. To compensate for this, the third technique for the marking of image sequences embeds the markings repeatedly in the still frames of certain sequences of the entire image sequence with the robustness against known attacks increasing by scaling the length of the information sequence to be embedded. In one extreme case the information is embedded into each frame of the entire video.

BRIEF DESCRIPTION OF THE DRAWINGS

The invention is exemplified without limiting the general scope of the invention with the aid of execution samples and referring to the drawings. The figures show:

FIG. 1: Writing process for a marking

FIG. 2: Reading process for a marking

DESCRIPTION OF THE EXECUTION SAMPLES

In FIG. 1 a flow chart for the embedding of binary coded information units into a data set, in the given case an image, is described as required by the invention. A position sequence is generated from the information present in the picture as well as from a secret key. This position sequence determines the embedding of the code into the image. A marked image whose markings cannot normally be disturbed by unauthorized access or by modification of the image or data set is obtained as a result.

For the detection process which is, for example, used in the tracking of possible illicit copying and distribution, the previously marked image is used together with the secret key previously used for embedding the information units to generate the position sequence with which the detection of the embedded code is possible (see FIG. 2). As a result one obtains the previously embedded code.

Figures 3, 4:
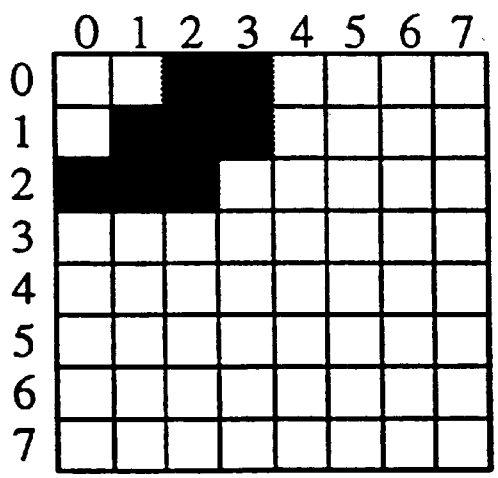
FIG. 3: Table for "1", "0" bits and "invalid" pattern
FIG. 4: Possible positions for the embedding of an information unit in an 8×8 block

FIGS. 3 and 4 are an example of the frequency based marking of color images, especially for an 8×8 pixel block. From the table depicted in FIG. 3 three different groups of relationship patterns between frequency coefficients are represented, namely the pattern for "1", the pattern for "0" and so-called "invalid" patterns. The "1" pattern represents an "1" bit, the "0" pattern represents an "0" bit of the embedded coded information unit. If too large modifications of the original data set were necessary for the process of the embedding to obtain the desired pattern for a bit, the block is invalid. In this case the size relations between the elements are modified such that an arbitrary "invalid" pattern is obtained in order to allow an unique decoding of the embedded information. The relationship patterns in the upper table represent dependencies of the relationship of the size of three elements (e1, e2, e3) of an 8×8 block.

Figure 5:
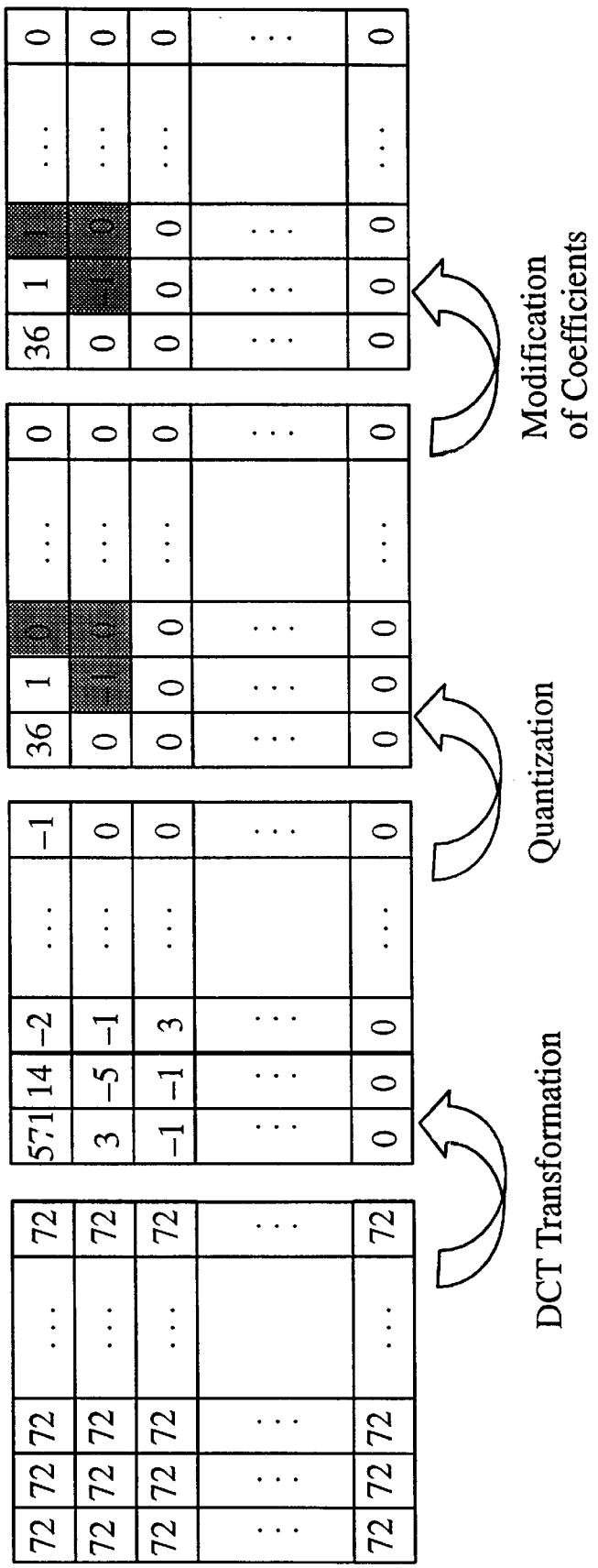
FIG. 5: Example of an embedding of an information unit by transformation, quantization and modification of frequency components

FIG. 5 exemplifies the embedding process which consists of a transformation step, a quantization step as well as a modification of the coefficients. The sequence depicted in FIG. 4 embeds a bit for a selected pattern in an 8×8 block.

Figure 6:
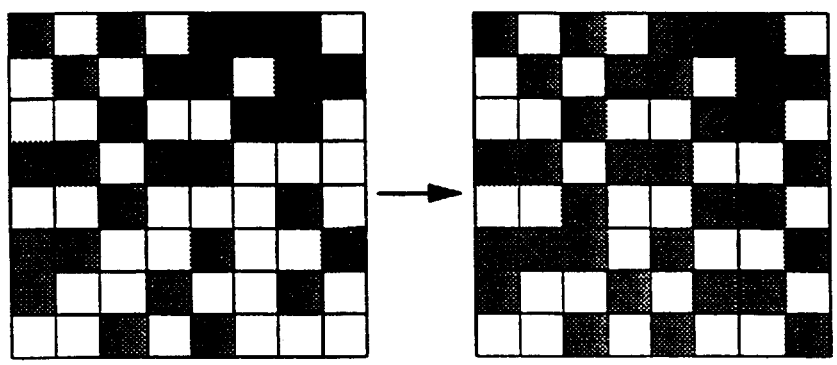
FIG. 6: Exemplary modification for marking with evenly distributed "1" and "0" bits
Figure 7:
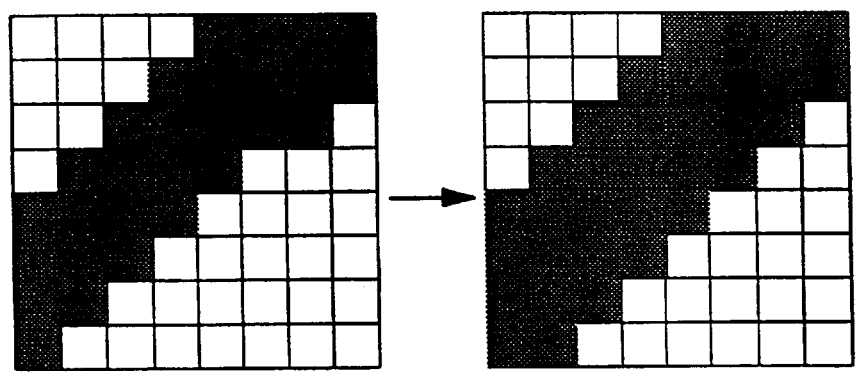
FIG. 7: Exemplary modification for marking with sharp edges between "1" and "0" bits.

FIGS. 6 and 7 contain two examples for relation based marking of two bilevel images. FIG. 6 represents an example for "dithered" bilevel images in which the modifications are evenly distributed across the entire block. The embedding is performed in such a way that the bit with the most neighbors of the same value is changed.

In contrast to this in FIG. 7 a bilevel image with sharp contrasts is shown. The embedding in this case occurs by modifying the edge between black and white pixels. The bit whose neighbors have the most opposite values is altered.

In both depicted cases the procedure considers the bits adjacent to the boundary of the block in the selection of the bits to be changed.

The aforementioned procedure of the invention allows the secret, hidden and robust embedding of information in multimedia creations, particularly into images and image sequences. The information embedded into the original data (identification tags, markings, labels) may be used to mark or identify the holder of the copyright of the multimedia creation, the recipient resp. user of the creation or the multimedia creation itself.

While the invention does not itself prevent the abuse of intellectual property, it is very likely that it serves to limit illicit use and distribution since the markings of the documents may be used as evidence in a court of law. The robust and hidden integration of information may, however, also be used for other purposes such as the embedding of personal information (e.g. patient records embedded in medical digital imaging) into images which would minimize the chance of matching false documents to a patient. Furthermore markings in multimedia creations may be used to automatically determine or measure the number of users.

The application fields for this invention include all electronic information services in which the protection from unauthorized access, distribution and duplication of digital data as well as the protection of intellectual property rights are required. The primary application is in the area of electronic publishing of newspapers, books, images, videos etc. on a portable medium such as CDs, CD-ROMs, floppy disks, tapes as well as via networks, satellites or terrestrial transmission media. The presented procedures are likewise to be used in the application fields of geographic information systems, medical information systems, electronic distribution systems such as pay TV, video on demand etc. as well as for the precise measurement of consumer participation in radio and TV.

What is claimed is:

1. A procedure for marking binary coded data sets, in particular image data and audio signals, by embedding at least one information unit in a data set, comprising the steps of:
    generating a discrete position sequence using properties characteristics of said data set and using a key;
    selecting, on the basis of said discrete position sequence, at least one block of image pixels or audio time signals;
    transforming said selected block of pixels or time signal from the spatial or time domain into a frequency domain wherein said transformed block has a plurality of frequency coefficients;
    embedding said information unit into said transformed block at positions which are within a predetermined frequency coefficient range.

2. A procedure according to claim 1, wherein said data set specific properties are at least one of content-based features, object features, geometric and format specific features.

3. A procedure according to claim 1, wherein said transformation function is a discrete cosine transformation, a wavelet transformation, a Fourier transformation, a Hadamard-Ward transformation or a Z transformation.

4. A procedure according to claim 1, wherein said blocks transformed into the frequency domain are quantized using quantization matrices.

5. A procedure according to claim 4, wherein said quantization matrices correspond to the quantization step used in the JPEG compression standard.

6. A procedure according to claim 4, wherein said information units are embedded into said blocks by using said generated position sequence for selecting the positions of the coefficients.

7. A procedure according to claim 4, wherein a requantization and retransformation of the data set into a spatial domain occurs after said embedding of said information units.

8. A procedure according to claim 1, wherein said embedding of the information units to be integrated occurs at the selected coefficient positions of said blocks by adjusting the size relations of selected frequency coefficient in order to equal a predetermined size relationship among said selected frequency coefficients.

9. A procedure according to claim 1, wherein said block includes the entirety of said data set.

10. A procedure according to claim 1, wherein said block is a single image pixel or a single audio sample signal.

11. A procedure according to claim 1, wherein said block is a set of image pixels/audio signals collected from the data set using said position sequence.

12. A procedure according to claim 1, wherein said block is an arbitrary continuous region of the image or any segment of continuous audio signals.

13. A procedure for marking binary coded bi-level image data sets by embedding at least one information unit in a data set, comprising the steps of:
    generating a discrete position sequence using property characteristics of the data set and using a key;
    selecting, on the basis of said discrete position sequence, a plurality of blocks each containing a plurality of picture elements, each of said picture elements having a value of "1" or "0";
    specifying a predetermined relationship between the number of picture elements having a "1" value and the number of picture elements having the "0" value;
    determining the actual relationship between the number of "1" values and the number of "0" values in said selected block;
    comparing said determined relationship with said predefined relationship and adjusting the relationship between the numbers of "1" and the numbers of "0" in said block until said determined relationship is equal to said predefined relationship wherein the embedding of an information unit equivalent to a "1" bit encoded in a block b satisfies the following requirement:

$$T_{1,min} < R(b) < T_{1,max}$$

with $R(b) = N_1/N$
$N_1$ = number of "1" bit pixels in a block b
$T_{1,min}$; $T_{1,max}$ upper and lower thresholds
N=total number of pixels in the block.

14. A procedure according to claim 13, wherein for an 8×8 block the following values hold:
$T_{1,min} = 55$
$T_{1,max} = 60$
$T_{2,min} = 40$
$T_{2,max} 32\ 45$.

15. A procedure according to claim 13, wherein in blocks with fairly even distribution of bit values in which bit embedding is performed, their neighboring positions have a significant portion of bits of equal value.

16. A procedure according to claim 13, wherein in blocks with uniform bit values said embedding takes place in positions in which areas of different values meet so that the bit with the most neighbors of inverse values is changed.

17. A procedure according to claim 13, wherein in the case of too large modifications being necessary for said embedding of information in the selected positions, the corresponding block is marked invalid with the invalid areas lying outside the ranges $T1=(T_{1,min}; T_{1,max})$, $T2=(T_{2,min}; T_{2,max})$.

18. A procedure according to claim 17, wherein an additional tolerance buffer is introduced between T1, T2 and invalid regions.

19. A procedure for reading marked binary coded data sets, in particular image data and audio signals wherein said binary coded data sets have been marked by embedding at least one information unit in a data set, said procedure comprising the steps of:
- generating a discrete position sequence using properties characteristic of said data set and using a key;
- selecting, on the basis of said discrete position sequence, a block of image pixels or audio time signals;
- transforming said selected block from a spatial or time domain into a frequency domain having a plurality of frequency coefficients;
- determining the relationship of ones of said frequency coefficients in a predefined frequency range; and
- recovering said information unit on the basis of said determined relationship.

20. A procedure for marking binary coded bi-level image data sets by embedding at least one information unit in a data set, comprising the steps of:
- generating a discrete position sequence using property characteristics of the data set and using a key;
- selecting, on the basis of said discrete position sequence, a plurality of blocks each containing a plurality of picture elements, each of said picture elements having a value of "1" or "0";
- specifying a predetermined relationship between the number of picture elements having a "1" value and the number of picture elements having the "0" value;
- determining the actual relationship between the number of "1" values and the number of "0" values in said selected block;
- comparing said determined relationship with said predefined relationship and adjusting the relationship between the numbers of "1" and the numbers of "0" in said block until said determined relationship is equal to said predefined relationship wherein the embedding of an information unit equivalent to a "0" bit encoded in a block b satisfies the following requirement:

$$T_{2,min} < R(b) < T_{2,max}$$

with $R(b) = N_1/N$

N=number of "1" bit pixels in a block

N=total number of pixels in the block.

$T_{2,min}$; $T_{2,max}$ upper and lower thresholds.

* * * * *